United States Patent [19]

Sink et al.

[11] 4,034,836
[45] July 12, 1977

[54] CLUTCH WITH FRICTION REDUCING LEVER ASSEMBLY

[75] Inventors: William H. Sink, Auburn; Richard A. Flotow, Fort Wayne, both of Ind.

[73] Assignee: Dana Corporation, Toledo, Ohio

[21] Appl. No.: 661,889

[22] Filed: Feb. 27, 1976

[51] Int. Cl.² .......................................... F16D 13/50
[52] U.S. Cl. ............................ 192/99 A; 192/70.29
[58] Field of Search ........... 192/99 A, 70.29, 70.30

[56] References Cited

U.S. PATENT DOCUMENTS

| | | | |
|---|---|---|---|
| 3,167,163 | 1/1965 | Smirl et al. | 192/99 A X |
| 3,211,265 | 10/1965 | Crutchley | 192/99 A X |
| 3,752,286 | 8/1973 | Sink | 192/111 A |
| 3,779,353 | 12/1973 | Maucher | 192/99 A |

FOREIGN PATENT DOCUMENTS

1,165,638  6/1958  France .......................... 192/70.29

*Primary Examiner*—Benjamin W. Wyche
*Attorney, Agent, or Firm*—Robert E. Pollock

[57] ABSTRACT

A friction clutch is provided with an improved connection for the release levers including an opening in the lever provided with a longitudinally extending sharp knife-edge for cooperating with a longitudinally extending pivot axis formed on an integral support means associated with one of the elements of the clutch. The integral support means and lever openings are constructed in such a manner as to positively constrain the levers in both a radial and circumferential direction with respect to the associate clutch element.

6 Claims, 8 Drawing Figures

CLUTCH WITH FRICTION REDUCING LEVER ASSEMBLY

CROSS-REFERENCE TO RELATED APPLICATION

U.S. Pat. application, Ser. No. 394,539 filed Sept. 5, 1973, now U.S. Pat. No. 3,891,072, to the inventors hereof shows a related invention.

BACKGROUND OF THE INVENTION

This invention relates generally to friction clutches and more specifically to an improved lever system for clutches of this type.

There is an increasing effort being made toward the use of high speed engines in present-day vehicles. Due to the increased engine speed, it is becoming more of a problem to provide a lever controlled friction type clutch which will operate satisfactorily. Not only do centrifugal forces become a major problem at higher speeds but circumferential forces are also present which must be dealt with in order to insure that the levers will always be in a position to function in their intended manner.

In the past, it has been well known to construct a clutch lever and its associate bearing support means in such a way as to try to counteract these forces. Arrangements providing connections directed to these problems can be found in U.S. Pat. Nos. 3,167,163 and 3,417,844. Both arrangements disclose knife-edge pivotal designs which serve to minimize friction between the engaging surfaces as the lever is pivoted between its operative and inoperative position. If properly controlled, the use of a sharp knife-edge in this type of design is most beneficial since it provides line contact between the cooperating surfaces thereby reducing friction between the parts to a minimum.

The arrangement shown in U.S. Pat. No. 3,167,163 provides locating means for the levers in the form of integral lugs on the pressure plate. These lugs extend in an axial direction and project into openings in the lever. The lever opening and cooperating lug are constructed with a sharp knife-edge and mating right angled corner surface respectively. Pivotal movement of the lever is accomplished by a strut which is located between the lever and cover. When the lever begins to pivot about the strut, a rocking action occurs causing the sharp knife-edge to move away from contact with the corner of the right angled surface. Thus, while the sides of the opening and the right angled surface on the lug provide a satisfactory circumferential and radially outward restraint for the levers they are still susceptible to displacement in a radially inward direction. This occurs due to the fact that, when using a strut to accomplish pivotal movement, the lever opening must be enlarged in a radial direction to accommodate for the rocking action of the strut.

The arrangement shown in U.S. Pat. No. 3,417,844 provides locating means for the levers consisting of a pair of spaced axially extending pins which cooperate with spaced slots provided in the outer sides of the levers. The slots are slightly oversized with respect to the pins in a radial direction to permit tilting action of the levers. Thus, while providing a structure which will positively locate the lever in a circumferential direction the levers can move relative to the pins in a radial direction.

Thus, while designs are known which attempt to counteract both radial and circumferential forces imposed on the levers, none disclose a structure wherein the levers are positively retained with respect to their bearing portions in both a radial and circumferential direction.

SUMMARY OF THE INVENTION

The lever assembly of the present invention overcomes the above mentioned problems by constructing an opening in the clutch lever and a locating means on one of the clutch elements of substantially the same size. This size relationship is such that the levers are positively retained with respect to the clutch element so that no relative movement occurs between the levers and the mating clutch element.

Further, the lever opening is provided with a sharp knife-edge surface for pivotal engagement with a pivot axis provided as an integral part of the locating means.

In the first embodiment, the features of the present invention are incorporated in a pull-type clutch with the lever support integrally formed on an axially fixed clutch adjusting ring secured to the cover element. The second embodiment illustrates the features incorporated in a push-type clutch showing the lever support integrally formed on an axially movable pressure plate element. The type of clutch determines the location of the integral support and the integral support in turn always provides the pivot axis engageable by the knife-edge on the lever.

From the above it will be seen that one object of this invention is to provide an integral support means on one of the clutch elements which cooperates with an opening in the clutch levers to positively prevent any relative movement therebetween.

Another object of the present invention is to provide a pivot portion on the clutch levers in the form of a sharp knife-edge which serves to substantially reduce friction between the operating members.

These and other objects of the present invention will become apparent upon review of the following detailed description when taken in conjunction with the drawings.

DESCRIPTION OF THE PREFERRED EMBODIMENTS

PULL TYPE CLUTCH

Figure 1:
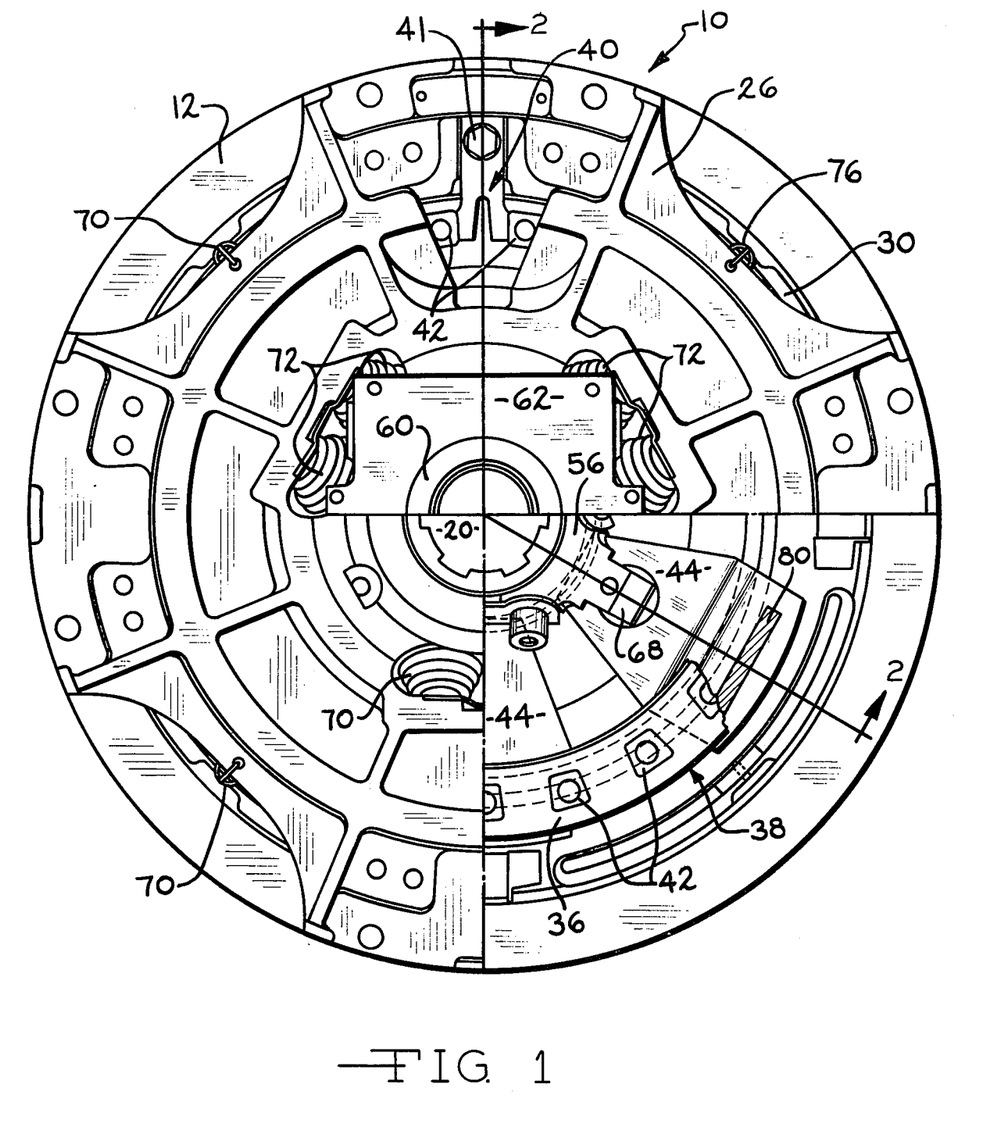
FIG. 1 is a partial broken away rear elevational view of a pull-type clutch embodying the principles of the present invention.
Figure 2:
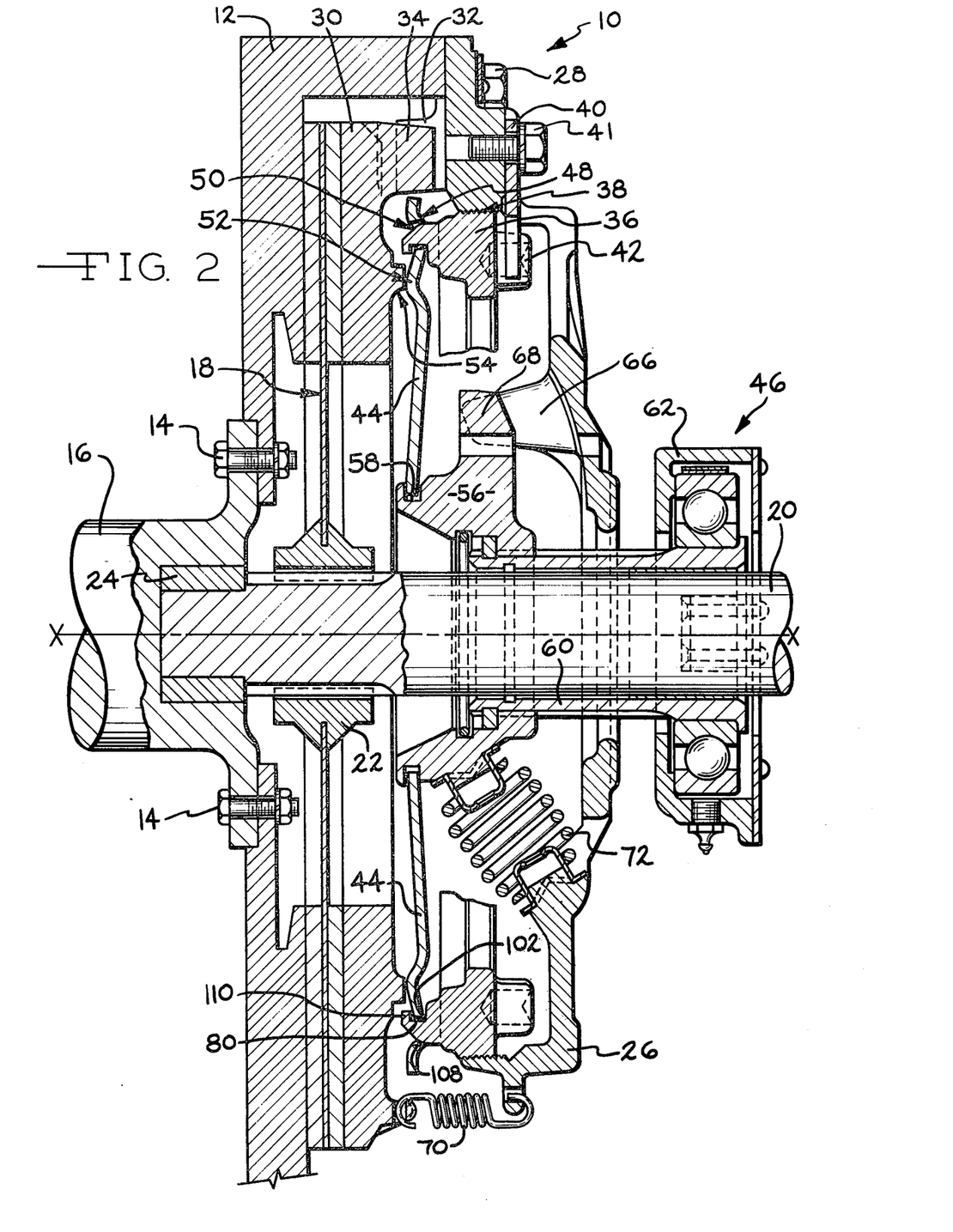
FIG. 2 is a sectional side elevational view taken along line 2—2 of FIG. 1.

Referring to the drawings and particularly to FIGS. 1 and 2, a pull-type friction clutch is shown generally at 10 for interconnecting a drive and driven member. The drive member is in the form of a cup-shaped flywheel 12 secured by bolts 14 to the flange portion of an engine driven crankshaft 16. The driven member includes a friction disc 18 connected to a transmission input shaft 20 by means of an internally splined hub 22. The forward end of the input shaft 20 is supported in a bearing 24 located in the end of the crankshaft 16. The opposite end of the input shaft 20 is supported in a bearing (not shown) carried in a conventional manner by the transmission case.

A torque transmitting connection is established between the flywheel 12 and friction disc 18 by means of the friction clutch 10. To this end, friction clutch 10 is provided with an axially fixed cover element 26 secured to the peripheral portion of the flywheel 12 by bolts 28 so as to rotate therewith and a pressure plate element 30 which is axially movable to clamp the friction disc 18 between it and the flywheel 12.

A means is provided to permit the pressure plate element 30 to rotate with the cover element 26 while allowing limited relative axial movement therebetween. For this purpose, axially inwardly extending drive lugs 32 are provided on the cover element 26 for cooperating with axially outwardly extending lugs 34 formed on the back face of the pressure plate 30. Also constituting a part of the cover element 26 is a conventional adjusting ring 36. As best seen in FIG. 2, the adjusting ring 36 is peripherally connected to cover element 26 by a threaded engagement shown generally at 38. This threaded connection permits the adjusting ring 36 to be circumferentially rotated relative to the cover element 26 in a well known manner to effect axial movement of the adjusting ring 36 with respect to the cover element 26 and other related portions of the clutch 10.

A locking arrangement is provided to position and maintain the adjusting ring 36 in its adjusted position. The illustrated and preferred locking arrangement is constructed in accordance with the teachings of U.S. Pat. No. 3,176,814 and includes a lock strap 40 secured to the cover element 26 by a bolt 41. The lock strap 40 extends radially inwardly with the inner portion positioned between a pair of axially extending lugs 42 integrally constructed on the back portion of adjusting ring 36.

In order to apply the desired clamping force and disengaging action to the pressure plate element 30 to establish or disconnect the torque transmitting connection between the flywheel 12 and friction disc 18, clutch 10 is further provided with a lever actuating system. More particularly, the lever actuating system includes a plurality of radially extending levers 44 and an axially movable lever operating means indicated generally by the reference numeral 46.

Levers 44 are pivotally disposed between the cover element 26 and pressure plate element 30. Specifically, the outer ends of the levers 44 are constructed with a pivot portion 48 cooperating with pivot engaging means 50 on the adjusting ring 36 and a bearing portion 52 cooperating with an annular bearing engaging means 54 on the pressure plate element 30. The inner ends of levers 44 are operatively connected to the lever operating means 46.

The lever operating means 46 consists of a retainer hub 56 having an annular groove 58 for receiving the inner ends of the levers 44, a cylindrical sleeve 60 encircling and piloted on the transmission input shaft 20 and a clutch release bearing 62. The sleeve 60 serves to rigidly interconnect the retainer hub 56 to the clutch release bearing 62.

It is essential for proper operation of the clutch 10 to have the lever operating means 46 rotate with the cover element 26. A means provided for this purpose consists of a pair of axially inwardly directed lugs 66 on the cover element 26 which cooperate with radially extending lugs 68 provided on the retainer hub 56. The connection is such that the entire lever operating means 56 rotates unitarily with the cover element 26 while being axially movable relative thereto.

The clutch 10 is a normally engaged clutch, i.e., the friction disc 18 is maintained in a normally engaged or clamped position between the flywheel 12 and pressure plate element 30, and to accomplish this, resilient means is provided to normally urge the pressure plate element 30 in a direction toward the flywheel 12. The resilient means takes the form of a plurality of pairs of circumferentially spaced coiled compression springs 72. The springs 72 are angularly disposed between the cover element 26 and the retainer hub 56 and are constructed in accordance with the teachings of U.S. Pat. No. 3,394,788. This construction results in the retainer hub 56, and hence the inner ends of the levers 44, being normally biased to the left.

A conventional clutch pedal (not shown) is operatively connected to the release bearing 62 and, when depressed in the usual manner, serves to pull the same rearwardly or to the right resulting in axial movement of the retainer hub 56, and thereby axial displacement of the inner ends of levers 44 in the same direction. Upon such movement, the pivot portion 48 of the levers 44 react about the pivot engaging means 50 on the adjusting ring 36 causing the bearing portion 52 on the levers 44 to be moved in a direction away from contact with the bearing engaging portion 54 on the pressure plate 30. As this displacement occurs, a plurality of circumferentially spaced coiled tension return springs 70, connected between the cover element 26 and pressure plate element 30, respond to withdraw the pressure plate element 30 out of engagement with the friction disc 18.

With clutches of this type, the levers are subjected to a centrifugal force which naturally increase as the rotational speed of the unit increases. As a result of this action the levers have a tendency to move radially outwardly with respect to the various operating parts of the clutch particularly when it is in its disengaged position. If this action is not fully prevented or at least contained to some degree the clutch operation is effected and the operating parts of the clutch have a tendency to wear and malfunction. In addition, levers of this type are constructed in such a manner as to be circumferentially contained with respect to the cover element so that throughout the various phases of pivotal movement, they will be positively located with respect thereto.

Further, it has been found that providing a knife-edge pivotal connection for such levers produces a most satisfactory arrangement since it substantially reduces friction and provides the most optimum in clutch lever design.

Figure 6:
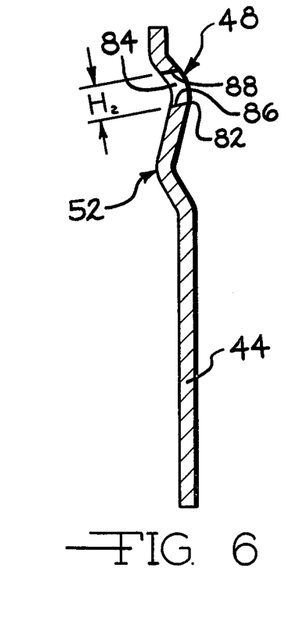
FIG. 6 is an enlarged sectional view of the lever taken along line 6—6 of FIG. 7.
Figure 7:
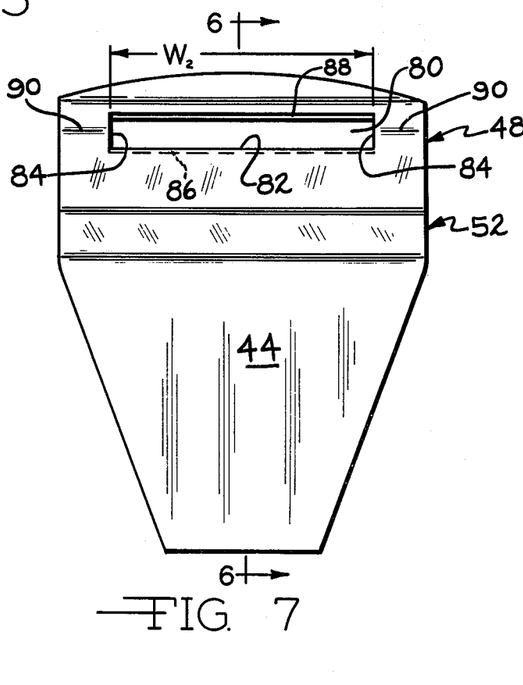
FIG. 7 is a front plan view of the lever as seen in FIG. 1.

As seen in FIG. 7, in plan view, each lever 44 comprises a pie-shaped inner portion and an integral substantially rectangular shaped outer portion. The inner portion functions as the actuating end of the lever 44 and as indicated earlier, is adapted to have its inner end engageable with the groove 58 in release hub 56. The outer portion functions as the operating end of the lever 44 and includes the bearing portion 52 engageable with bearing means 54 on the pressure plate element 30 and the pivot portion 48 cooperating with the pivot engaging means 50 on the adjusting ring 36. To provide the desired cooperation between the operating end of lever 44, the associated pressure plate 30 and adjusting ring 36, the lever is initially stamped in the form of a flat blank and a bending operation subsequently performed on the rectangular shaped outer portion to provide opposed and radially spaced longitudinally extending rib portions. As best seen in FIG. 6 the detent portions extend completely across the rectangular shaped outer portion of lever 44 with the outer rib portion serving as the pivot portion 48 and the inner rib portion serving as the bearing portion 52.

Prior to the bending operation, a longitudinally extending rectangular shaped opening 80 is pierced through the blank. The boundaries of opening 80 include a pair of axially spaced flat parallel side walls 84—84 and a pair of radially spaced parallel connecting inner and outer walls 86 and 88 respectively.

Opening 80 is suitably located in the outer portion of the lever blank so that when the bending operation takes place, opening 80, as viewed in FIG. 6, will be angularly disposed so as to provide a sharp knife-edge 82 extending completely along the entire length of inner wall 86. The angular disposition of the opening 80 is such that the wall 86 provides an acute angled surface for clearance purposes and swivel action of the lever. This arrangement will be covered in more detail later.

Further, it will be seen that opening 80 is centrally positioned in the pivot portion 48 thereby providing a pair of axially spaced connecting members 90—90 outwardly of side walls 84—84.

The bearing portion 52 also extends completely across the rectangular portion of lever 44 and when the clutch is engaged, is in substantial line contact with a radially extending flat surface 94 provided on bearing engaging means 54 on pressure plate 30.

Figure 3:
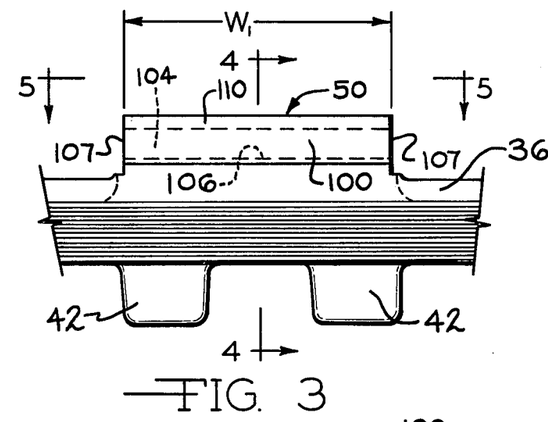
FIG. 3 is an enlarged plan view of an upper portion of the adjusting ring of the present invention.

Pivot engaging means 50 on adjusting ring 36 is constructed to provide a satisfactory pivotal connection for levers 44 and also prevent the levers from moving relative to adjusting ring 36 and accordingly cover element 26.

To accomplish the desired result the pivot engaging means 50 is constructed as an integral part of adjusting ring 36. More particularly, pivot engaging means 50 includes an axially inwardly directed lug 100 for each lever 44. Lug 100 is adapted to extend into lever opening 80 and provide a longitudinally extending pivot axis 102 for knife-edge 82.

In order to maintain the sharp knife-edge 82 in constant contact with pivot axis 102 under all operating conditions, lug 100 is made substantially rectangular in configuration when viewed from its end so as to closely conform to the shape of opening 80. By this arrangement lug 100 cooperates with the opening 80 and serves to provide the necessary means for positively constraining the levers 44 in both a radial and circumferential direction with respect to its supporting structure, herein being adjusting ring 36.

Figure 4:
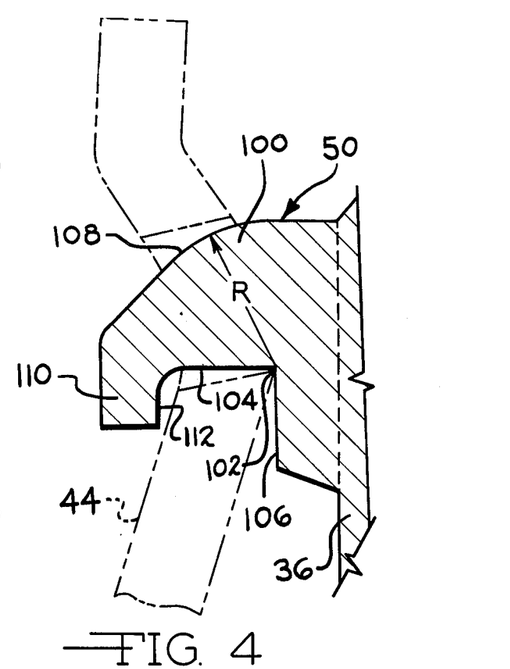
FIG. 4 is a further enlarged sectional view taken along line 4—4 of FIG. 3.
Figure 5:
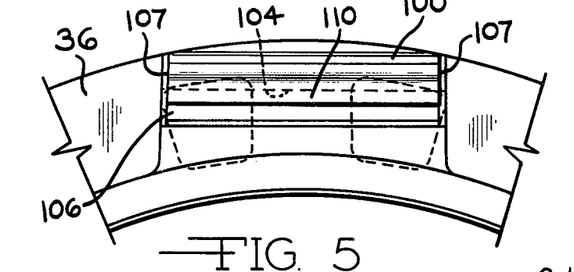
FIG. 5 is a view taken along line 5—5 of FIG. 3.

With particular reference to FIGS. 3–5, lug 100 has a right angled notch the apex of which serves as pivot axis 102. The right angled notch includes a flat surface 104 originating from pivot axis 102 and extending in an axial direction parallel to central axis X—X of clutch 10 and a radially extending flat surface 106 originating from pivot axis 102 and in a direction perpendicular to surface 104. Accordingly surface 106 lies in a plane which is perpendicular to central axis X—X of clutch 10. Further lug 100 is constructed of a width $W_1$, FIG. 3, whereby a pair of outer flat walls 107—107 are formed.

So that the lever knife edge 82 may pivot about pivot axis 102 without obstruction, lugs 100 are constructed with an arcuate outer wall 108. This arcuate wall 108, most clearly shown in FIG. 4, is generated from a point lying on pivot axis 102 and indicated by radius R. The length of radius R is slightly less than the height $H_2$ of lever opening 80 as seen in FIG. 6. The dimnsional tolerances are such as to permit the knife-edge 82 to react about pivot axis 102 and allow the outer wall 88 of opening 80 to be spaced from but closely follow along the curvature of arcuate wall 108 as lever 44 is pivoted.

In addition, with reference to FIGS. 3 and 5, the width $W_1$, of lug 100 is slightly less than width $W_2$ of opening 80. Again, the dimensional tolerances between opening side walls 84—84 and lug side walls 107—107 are such that they will permit relative movement but coact to maintain the lever 44 in a circumferential direction with respect to lug 100.

From the foregoing it can be seen that opening inner and outer walls 86 and 88 coact with lug inner and outer surfaces 104 and 108 to act as positive centrifugal restraint for levers 44. In addition, opening side walls 84—84 coact with lug side walls 107 and 107 to act as a positive circumferential restraint for levers 44.

It has been found advantageous to provide a means for retaining the levers 44 in assembled relation during shipping or for storing purposes. To this end a radially inwardly directed lip 110 is constructed as an integral part of lug 100. Lip 110 is spaced outwardly from and parallel to the flat surface 106 and has a radially inwardly directed face 112 which, when the lever 44 is initially assembled, will overlap and cooperate with the inner surface of the lever 44. Without lips 110, due to the reaction of springs 72 on retainer hub 56, the levers 44 could conceivably be displaced from engagement with lugs 100 causing an inconvenience during initial assembly or shipping.

While not essential it has been found beneficial to provide lips 110 on lugs 100 to contain levers 44 so that they do not become dislodged from their assembled position in transit or during installation in a vehicle.

OPERATION

Referring to FIG. 2, the clutch 10 is shown in its normally engaged position. In the engaged position, and assuming the vehicle engine is running, torque is being transmitted from the vehicle engine resulting in rotation of the flywheel 12 and thereby corresponding rotation of the clutch 10. Since the inner ends of levers 44 are shifted inwardly to the left by compression spring 72, the reaction of the lever knife-edge 82 about pivot axis 102 results in the bearing portion 52 on the levers 44 acting in a clockwise direction on the bearing engaging means 54 of the pressure plate element 30 thereby urging the friction disc 18 into clamping engagement with the flywheel 12. The clamping force applied by the pressure plate element 30 is sufficient to cause simultaneous rotation of the friction disc 18 so that the engine torque passes to input shaft 20 and therefrom to the transmission gearing.

The disengagement of clutch 10 results when the clutch pedal is depressed to effect axial displacement of the throw-out bearing 62 to the right. As this axial movement takes place the compression springs 72 are loaded by the retainer hub 56 through sleeve 60 and the lever ends move in this direction as bearing portion 52 of levers 44 swing in a counter-clockwise direction about knife-edge 82 away from the bearing surface 54 of pressure plate element 30. Thus, the clamping force previously applied to the pressure plate element 30 is removed and retraction springs 70 now become effective to withdraw the pressure plate element 30 in a axial direction away from contact with friction disc 18 to disrupt the flow of torque from the engine.

Re-establishing the drive connection is accomplished when the clutch pedal pressure is removed from throw-out bearing 62 and compression springs 72 are in a position to unload and force the retainer hub 56 to the left to assume its initial position. The leftward movement of retainer hub 56 carries the inner ends of levers 44 in the same direction so that the pivotal movement of the levers 44 about pivot axis 102 will again bring the lever bearing portion 52 into engagement with the bearing engaging means 54 on pressure plate 30 so that the driven disc 18 is clamped between it and flywheel 12.

It will be apparent that, at no time during the pivotal movement of the levers 44 will the knife-edge 82 ever be moved from contact with pivot axis 102. Further, when clutch 10 is in its fully disengaged position, the levers 44 will be prevented from moving either radially inwardly or outwardly with respect to the cover element 26 by means of the construction of lever openings 80 and the cooperating lugs 100 on adjusting ring 36.

The embodiment disclosed in FIG. 8 differs from the structure described in connection with FIGS. 1–7 in that the positive restraint for the lever is reversed to accommodate the operation of a push-type friction clutch, i.e., one in which the radially inner end of the lever 44 is pushed toward the friction discs 18 to disengage the clutch. In doing so, the identical lever is used but reversed and the pivot engaging means 50 is constructed as an integral part of the pressure plate element 30 while the bearing engagement means 54 is constructed as an integral part of the adjusting ring 36. As in the previous embodiment, since the adjusting ring 30 is carried by and locked with respect to cover element 26, it is considered a part thereof. Thus it can be seen that the various parts are identical and merely consist of a reversal in order to accomplish a push-type operation in this instance as opposed to a pull-type operation as required in the first embodiment.

Figure 8:
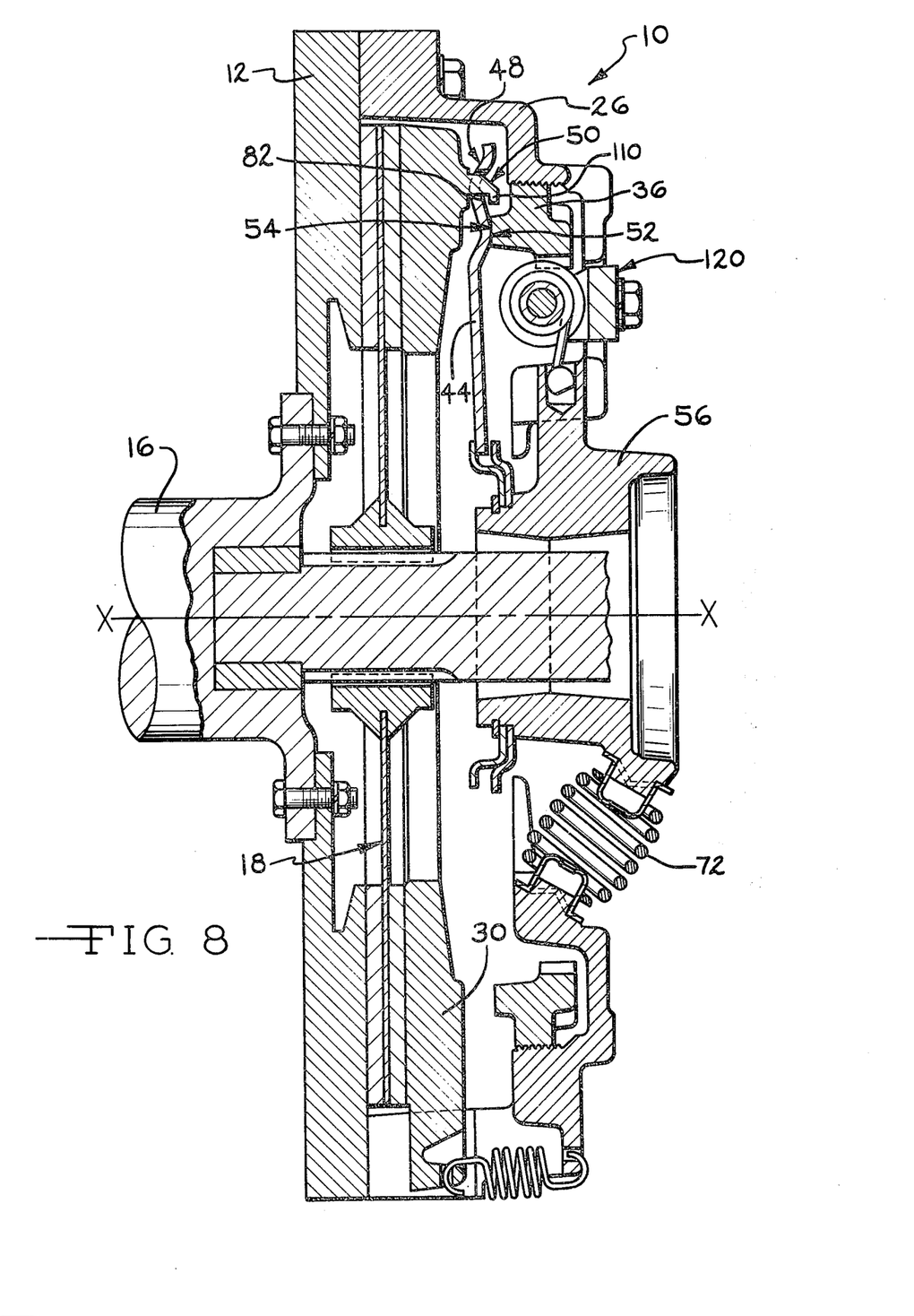
FIG. 8 is another embodiment showing a push-type clutch employing the principles of the present invention.

In view of the similarities, the parts appearing in FIG. 8 have been correspondingly numbered. Further, since the parts function in the same manner as those described in connection with the first embodiment, only a brief statement with respect to the lever operation is warranted for an understanding of this embodiment.

As seen in FIG. 8, the compression springs 72 are angularly disposed between the cover element 26 and release hub 56 so as to react in the opposite direction to normally urge the latter away from the driven member 18. This movement serves to draw the inner ends of levers 44 to the right away from the driven member 18 so that the lever pivot portion 48 react about the lever bearing portion 52 on adjusting ring 36 to axially shift the pressure plate 30 into clamping engagement with the driven member 18.

Releasing the drive connection is accomplished by depressing the usual clutch pedal in a manner which causes the release hub 56 to be pushed inwardly toward the driven member 18. As this movement tends to swing the pivot portion 48 of the levers 44 away from the driven member 18, return springs 70 become active to withdraw the pressure plate 30 from clamping engagement with the driven member 8.

Upon removal of clutch pedal pressure, the parts are returned to the position illustrated by means of the angled compression springs 72.

The lock arrangement for holding the adjusting ring 36 in its locked position has been replaced with an automatic self-adjusting mechanism 120 constructed in accordance with the teachings of U.S. Pat. No. 3,752,286.

From the foregoing, it will be apparent that the present invention provides a structure which will prevent any relative sliding movement between the lever knife-edge 82 and the stationary pivot engaging means 50. Thus, due to the coacting opening walls 84, 84 86 and 88 and lug walls 107, 107, 104 and 108 respectively, a radial and circumferential restraint is provided which serves to positively prevent any relative displacement from occurring between the lever knife-edge 82 and pivot engaging means 50 when the clutch is in its engaged or disengaged position.

As previously pointed but the positive restraint has been accomplished by constructing an integral lug 100 on one of the clutch elements to function as the pivot engaging means 50 so that the lug 100 extends into the lever opening 80. The lever knife-edge 82 in opening 80 engages the pivot axis 102 formed by right angled surfaces 104 and 106.

With lug wall surface 104 being constructed in a direction parallel to the cluch axis X—X and the angular formation of lever opening 80, as best seen in FIG. 4, inner wall 86 is constructed at an acute angle with respect to surface 104 on lug 100 and the inner wall 86 forms an angular surface on the lever 44 constructed at an obtuse angle with respect to an imaginary line extending inwardly along lug wall surface 106.

Since pivot axis 102 is fixed with respect to its associate clutch element and by means of the cooperation between lever opening walls 84, 84, 86 and 88 and lug walls 107, 107, 104 and 108, it will be seen that the levers 44 will be positively constrained with respect to the lugs 100 thereby preventing any possible sliding movement therebetween under any condition of operation.

It should be further noted that the knife-edge 82 is approximately normal to a 45° angle so that the axially directed surface 104 restricting centrifugal movement is at a right angle to the force. Additionally, the radially directed surface 106 receiving the load is also at a right angle to the load. By making the inner wall 86 on the lever opening 80 extend from the knife-edge 82 at an acute angle, motion of the lever 44 is possible about the knife-edge 82 at the 90° junction of the surfaces 104 and 106 without any interference.

Although the present invention has been described in connection with a spring-loaded clutch, it should be apparent that the principles of the invention could be provided in other types of clutches. Accordingly, the scope of the invention is not to be limited by the examples given but is to be assessed as defined by the appended claims.

What we claim is:

1. In a clutch adapted to drivingly connect rotatable drive and driven members and having a central axis; an axially stationary cover element for securement to a drive member for rotation therewith; an axially movable pressure plate element connected to the cover element for rotation therewith and limited axial movement relative thereto; resilient means for urging the pressure plate element axially into engagement with the driven member to clamp the same to the drive member; and pivotally movable levers disposed between the cover and pressure plate elements for moving the pressure plate element axially relative to the cover element into and out of engagement with the driven member; the improvement comprising:

opposed pivot and bearing portions on the levers; including longitudinally extending ribs and said pivot portion spaced radially outwardly of said bearing portion;

a pivot engaging means on one of the cover and pressure plate elements engaging said pivot portion of the lever;

an opposed bearing engaging means on the other of the cover and pressure plate elements engaging said bearing portion on the lever;

said pivot portion including an opening having spaced side walls and connecting radially inner and outer walls and a sharp knife-edge formed on said radially inner connecting wall with said inner connecting walls sloping radially inwardly and axially from said knife-edge toward the clutch central axis;

said pivot engaging means including an integral axially directed lug having spaced side walls and connecting inner and outer walls and a pivot axis formed on one of said connecting walls;

said lug extending into said opening with said sharp knife-edge engaging said pivot axis and said side walls and inner and outer connecting walls of said opening and lug coacting to define a positive restraint for said levers to prevent relative movement and maintain said sharp knife-edge in contact with said pivot axis during pivotal movement of said lever.

2. A clutch according to claim 1 wherein said sloping wall is disposed at an acute angle with respect to said inner connecting wall on said lug.

3. A clutch according to claim 2 wherein said opening and lug are rectangular in configuration and said knife-edge and pivot axis extend in a longitudinal direction.

4. In a clutch adapted to drivingly connect rotatable drive and driven members and having a central axis; an axially stationary cover element for securement to a drive member for rotation therewith; an axially movable pressure plate element connected to the cover element for rotation therewith and limited axial movement relative thereto; resilient means for urging the pressure plate element axially into engagement with the driven member to clamp the same to the drive member; and pivotally movable levers disposed between the cover and pressure plate elements for moving the pressure plate element axially relative to the cover element into and out of engagement with the driven member; the improvement comprising:

opposed pivot and bearing portions on the levers;

a pivot engaging means integral and axially fixed with the cover element and engaging said pivot portion on the lever;

an opposed bearing engaging means integral and axially movable with the pressure plate element and engaging said bearing portion on the lever;

said pivot portion including an opening having spaced side walls and connecting radially inner and outer walls and a sharp knife-edge formed on said radially inner connecting wall;

said pivot engaging means including an axially directed lug extending inwardly toward the driven member and having spaced side walls and connecting inner and outer walls and a pivot axis formed on one of said connecting walls;

said lug extending into said opening with sharp knife-edge engaging said pivot axis and said side walls and inner and outer connecting walls of said opening and lug coacting to define a positive restraint for said levers to prevent relative movement and maintain said sharp knife-edge in contact with said pivot axis during pivotal movement of said lever.

5. In a clutch adapted to drivingly connect rotatable drive and driven members and having a central axis; an axially stationary cover element for securement to a drive member for rotation therewith; an axially movable pressure plate element connected to the cover element for rotation therewith and limited axial movement relative thereto; resilient means for urging the pressure plate element axially into engagement with the driven member to clamp the same to the drive member; and pivotally movable levers disposed between the cover and pressure plate elements for moving the pressure plate element axially relative to the cover element into and out of engagement with the driven member; the improvement comprising:

radially spaced outer and inner pivot and bearing portions respectively on the levers;

a pivot engaging means on the cover element engaging said lever pivot portion;

a bearing engaging means on the pressure plate element engaging said lever bearing portion;

said lever pivot portion including an opening having spaced side walls and connecting inner and outer walls and a sharp knife-edge formed on said inner connecting wall;

said pivot engaging means on the cover element including an integral axially inwardly directed lug having spaced side walls and connecting inner and outer walls and a pivot axis formed on said inner connecting wall;

said lug extending inwardly into said opening with said sharp knife-edge engaging said pivot axis and said side walls and inner and outer connecting walls of said opening and lug co-acting to define a positive restraint for said levers to prevent relative movement with respect to the cover element and maintain said sharp knife-edge in contact with said pivot axis during pivotal movement of said lever and said lug defines a notch having right-angled flat surfaces meeting at an apex, one of said surfaces extending from said apex in an axial direction parallel to the clutch axis and said other surface extending from said apex in a direction radially inwardly therefrom and perpendicular to the clutch axis, said apex defining said pivot axis and said one surface extending parallel to the clutch axis defining said connecting inner wall of said lug.

6. In a clutch having a central axis, a drive member; a driven member; a cover element secured to said drive member so as to be axially fixed with respect thereto; a pressure plate element drivingly connected to said cover element and disposed adjacent the driven member and adapted to be moved axially relative to said cover element into and out of engagement with the driven member; an adjusting ring connected to the cover element for relative circumferential movement; radially extending levers pivotally connected between the adjusting ring and pressure plate element for moving the latter into and out of engagement with the driven member; means operably connected to the levers to pivot the same about the pivotal connection for moving the pressure plate element into and out of engagement with the driven member; the improvement in the clutch comprising:
 a fixed pivot engaging means on the adjusting ring and an opposed axially movable bearing engaging means on the pressure plate element;
 lever restraining means on said pivot engaging means including:
  an integral axially extending lug having a pivot axis, a first radially outward axially extending flat inner wall parallel to the central axis of the clutch, a second radially extending flat wall perpendicular to and merging with said first wall to define a right angle surface having an apex laying on said pivot axis and an arcuate outer wall generated from a point lying on said pivot axis;
 the lever including an opening having radially spaced inner and outer walls;
 said lug on said pivot engaging means extending into said lever opening;
 said inner wall of said lever opening having a sharp knife-edge in constant engagement with said pivot axis and said inner and outer walls of said opening maintained in close proximity to said inner wall and outer arcuate wall of said lug to thereby define a radial restraint preventing relative sliding displacement between said lever and lug in a radial direction; and
 said opening and lug having spaced side walls maintained in close proximity to thereby define a circumferential restraint preventing relative sliding displacement between said lever and lug in a circumferential direction.

* * * * *